United States Patent
Ray et al.

(10) Patent No.: US 12,106,045 B2
(45) Date of Patent: Oct. 1, 2024

(54) SELF-LEARNING ANNOTATIONS TO GENERATE RULES TO BE UTILIZED BY RULE-BASED SYSTEM

(71) Applicant: International Business Machines Corporation, Armonk, NY (US)

(72) Inventors: Anupama Ray, Bangalore (IN); Christopher Fryett, Billings, MT (US); Amitkumar Manoharrao Paradkar, Mohegan Lake, NY (US); Nicholas Tsang, Saratoga, CA (US); Florian Wilhelm, Berlin (DE)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 17/500,221

(22) Filed: Oct. 13, 2021

(65) Prior Publication Data
US 2023/0111052 A1    Apr. 13, 2023

(51) Int. Cl.
*G06F 40/20* (2020.01)
*G06F 40/186* (2020.01)
(Continued)

(52) U.S. Cl.
CPC .......... *G06F 40/205* (2020.01); *G06F 40/186* (2020.01); *G06F 40/242* (2020.01);
(Continued)

(58) Field of Classification Search
CPC .... G06F 40/205; G06F 40/186; G06F 40/242; G06F 40/253; G06F 40/289;
(Continued)

(56) References Cited

U.S. PATENT DOCUMENTS 5,926,784 A    7/1999   Richardson et al.
7,379,862 B1   5/2008   Chang et al.
(Continued)

OTHER PUBLICATIONS

Hughes, Baden, et al. "A distributed architecture for interactive parse annotation." Proceedings of the Australasian Language Technology Workshop (2005), pp. 207-214. (Year: 2005).*

(Continued)

*Primary Examiner* — Feng-Tzer Tzeng
(74) *Attorney, Agent, or Firm* — Shackelford, McKinley & Norton, LLP; Robert A. Voigt, Jr.

(57) ABSTRACT

A computer-implemented method, system and computer program product for generating rules to be utilized by a rule-based system. A parser analyzes a received string of words according to grammatical rules to generate a parse tree. The parse tree may then be reviewed by a user to determine if such a parse tree represents the appropriate syntactic structure of the string of words. If the user believes that the parse tree does not represent the appropriate syntactic structure of the string, then the user, who does not need to possess the expertise of natural language processing, may select the nodes and/or edges of the parse tree in a particular order that corresponds to the correct syntactic structure of the string of words. A grammatical rule is then created for parsing the string of words based on the user selection of nodes and/or edges of the parse tree in a particular order.

20 Claims, 8 Drawing Sheets

(51) Int. Cl.
*G06F 40/205* (2020.01)
*G06F 40/242* (2020.01)
*G06F 40/253* (2020.01)
*G06F 40/289* (2020.01)
*G06N 3/02* (2006.01)

(52) U.S. Cl.
CPC .......... *G06F 40/253* (2020.01); *G06F 40/289* (2020.01); *G06N 3/02* (2013.01); *G06F 40/20* (2020.01)

(58) Field of Classification Search
CPC ........ G06F 40/211; G06N 3/02; G06N 3/006; G06N 3/092; G06N 3/044; G06N 3/0464; G06N 3/0895; G06N 5/022
See application file for complete search history.

(56) References Cited

U.S. PATENT DOCUMENTS

| | | | |
|---|---|---|---|
| 10,579,721 B2 | 3/2020 | Mukherjee et al. | |
| 10,762,301 B1 | 9/2020 | Johnson | |
| 10,831,733 B2 | 11/2020 | Gomez et al. | |
| 2004/0034525 A1* | 2/2004 | Pentheroudakis | G06F 40/242 704/9 |
| 2013/0013543 A1* | 1/2013 | Dull | G05B 13/027 706/25 |
| 2013/0332812 A1* | 12/2013 | Houston | G06Q 10/10 715/230 |
| 2015/0294220 A1 | 10/2015 | Oreif | |
| 2016/0196334 A1* | 7/2016 | Bastide | G06F 40/205 707/776 |
| 2016/0259851 A1* | 9/2016 | Hopkins | G06F 40/216 |
| 2016/0267078 A1* | 9/2016 | Morehead | G06F 40/58 |
| 2017/0046616 A1* | 2/2017 | Socher | G06N 3/084 |
| 2017/0053646 A1* | 2/2017 | Watanabe | G06N 3/045 |
| 2017/0140753 A1* | 5/2017 | Jaitly | G10L 15/02 |
| 2018/0190280 A1* | 7/2018 | Cui | G10L 15/16 |
| 2018/0253648 A1* | 9/2018 | Kaskari | G06F 18/2413 |
| 2018/0276532 A1* | 9/2018 | Kim | G06N 3/045 |
| 2018/0285444 A1* | 10/2018 | Joshi | G06F 16/435 |
| 2018/0300317 A1* | 10/2018 | Bradbury | G06F 40/44 |
| 2019/0005163 A1* | 1/2019 | Farrell | G06F 16/9024 |
| 2019/0066843 A1* | 2/2019 | Carlson | G16H 10/60 |
| 2019/0139540 A1* | 5/2019 | Kanda | G10L 15/19 |
| 2019/0370389 A1* | 12/2019 | Blouw | G06N 3/049 |
| 2020/0364765 A1* | 11/2020 | Doh | G06Q 30/0625 |
| 2021/0004439 A1* | 1/2021 | Xiong | G06F 40/284 |
| 2021/0109995 A1* | 4/2021 | Mihindukulasooriya | G06F 40/268 |
| 2021/0174016 A1* | 6/2021 | Fox | G06N 3/044 |
| 2021/0397787 A1* | 12/2021 | Nagvenkar | G06N 3/04 |
| 2022/0198294 A1* | 6/2022 | Schneuwly | G06F 16/24564 |
| 2022/0391433 A1* | 12/2022 | Maheshwari | G06N 3/0464 |

OTHER PUBLICATIONS

Pajas, Petr, et al. "Recent advances in a feature-rich framework for treebank annotation." Proceedings of the 22nd International Conference on Computational Linguistics (Coling 2008). 2008, pp. 673-680 (Year: 2008).*

Mejer, Avihai, et al. "Training dependency parser using light feedback." Proceedings of the 2012 Conference of the North American Chapter of the Association for Computational Linguistics: Human Language Technologies. 2012, pp. 488-497 (Year: 2012).*

Evensen, Sara, et al. "Ruler: Data programming by demonstration for document labeling." Findings of the Association for Computational Linguistics: (2020), pp. 1996-2005 (Year: 2020).*

Choi, Dongjin, et al. "TagRuler: Interactive Tool for Span-Level Data Programming by Demonstration." arXiv preprint arXiv: 2106. 12767 (Jun. 24, 2021), pp. 1-5. (Year: 2021).*

Kalliopi Zervanou, "Template Rule Development for Information Extraction: The NeT Method," Thesis, The University of Manchester, Sep. 2008, pp. 1-245.

Akbik et al., "Propminer: A Workflow for Interactive Information Extraction and Exploration using Dependency Trees," Proceedings of the 51st Annual Meeting of the Association for Computational Linguistics: System Demonstrations, Sofia, Bulgaria, Aug. 2013, pp. 157-162.

Solis et al., "A User-Interactive Machine Learning Model for Identifying Structural Relationships of Code Features," Slide Presentation, 2019, pp. 1-13.

Onorati et al., "Pat-in-the-Loop: Declarative Knowledge for Controlling Neural Networks," Future Internet, vol. 12, No. 12, 2020, pp. 1-12.

* cited by examiner

SELF-LEARNING ANNOTATIONS TO GENERATE RULES TO BE UTILIZED BY RULE-BASED SYSTEM

TECHNICAL FIELD

The present disclosure relates generally to rule-based systems, and more particularly to self-learning annotations to generate rules to be utilized by a rule-based system.

BACKGROUND

A rule-based system is used to store and manipulate knowledge to interpret information in a useful way. It is often used in artificial intelligence applications and research.

An example of a rule-based system is a text-based system that exploits the grammatical rules to parse a string of words into a parse tree by a parser based on such grammatical rules. A parse tree is an ordered rooted tree that represents the syntactic structure of a string according to the grammatical rules. As a result, a parse tree may represent a real-word construction, such as a sentence. Such a parse tree may then be utilized by a compiler to generate machine code.

SUMMARY

In one embodiment of the present disclosure, a computer-implemented method for generating rules to be utilized by a rule-based system comprises receiving a string of words. The method further comprises analyzing the received string of words according to grammatical rules to generate a parse tree. The method additionally comprises displaying the parse tree to a user. Furthermore, the method comprises receiving a user selection of nodes and/or edges of the parse tree in a particular order corresponding to a marked annotation. Additionally, the method comprises creating a grammatical rule for parsing the string of words based on the marked annotation.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
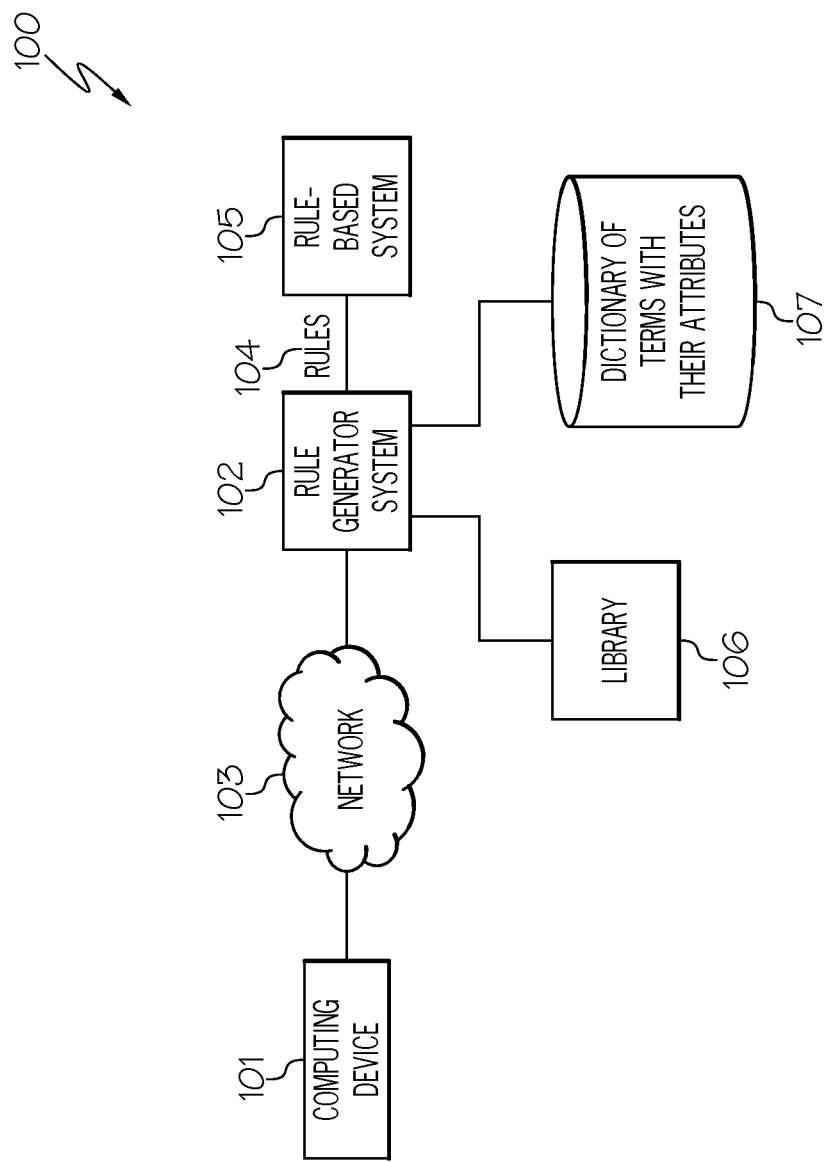
FIG. 1 illustrates a communication system for practicing the principles of the present disclosure in accordance with an embodiment of the present disclosure.

As stated in the Background section, a rule-based system is used to store and manipulate knowledge to interpret information in a useful way. It is often used in artificial intelligence applications and research.

An example of a rule-based system is a text-based system that exploits the grammatical rules to parse a string of words into a parse tree by a parser based on such grammatical rules. A parse tree is an ordered rooted tree that represents the syntactic structure of a string according to the grammatical rules. As a result, a parse tree may represent a real-word construction, such as a sentence. Such a parse tree may then be utilized by a compiler to generate machine code.

Unfortunately, in order to design such rule-based systems, natural language processing expertise is required to develop the grammatical rules that are used to build the parse tree.

The embodiments of the present disclosure provide a means for developing the grammatical rules to be utilized by a rule-based system, such as to build parse trees, without requiring the expertise of natural language processing. Furthermore, the embodiments of the present disclosure generate grammatical rules that are based on a generic pattern so as to provide maximum coverage that are compliant to existing rules.

In some embodiments of the present disclosure, the present disclosure comprises a computer-implemented method, system and computer program product for generating rules to be utilized by a rule-based system. In one embodiment of the present disclosure, a parser analyzes a received string of words according to grammatical rules to generate a parse tree. A "parse tree," as used herein, refers to an ordered rooted tree that represents the syntactic structure of a string of words according to the grammatical rules. The parse tree may then be displayed to a user, such as a user of a computing device, via a user interface of the computing device. The user, in turn, may review the parse tree to determine if such a parse tree represents the appropriate syntactic structure of the string of words that was received by the parser. If the user believes that the parse tree does not represent the appropriate syntactic structure of the string of words, then the user, who does not need to possess the expertise of natural language processing, may select the nodes and/or edges of the parse tree in a particular order corresponding to a marked annotation that corresponds to the correct syntactic structure of the string of words. Such a marked annotation may be said to correspond to a "concept" that will be used to create a grammatical rule for generating a parse tree with such a concept. That is, a grammatical rule for parsing the string of words based on the user selection of nodes and/or edges of the parse tree in a particular order is created. In one embodiment, the particular nodes and/or edges of the parse tree selected by the user correspond to a format conversion of the parse tree. That is, such a selection by the user essentially corresponds to a new tree (e.g., abstract syntax tree), which is then traversed to construct a grammatical rule, such as via an abstract syntax tree interpreter or a parse tree walker. In this manner, grammatical rules are developed to be utilized by a rule-based system, such as to build parse trees, without requiring the expertise of natural language processing.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill the relevant art.

Referring now to the Figures in detail, FIG. 1 illustrates an embodiment of the present disclosure of a communication system 100 for practicing the principles of the present disclosure. Communication system 100 includes a computing device 101 connected to a rule generator system 102 via a network 103.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and rule generator system 102. It is noted that both computing device 101 and the user of computing device 101 may be identified with element number 101.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

Rule generator system 102 is configured to generate rules, such as grammatical rules, to be utilized by a rule-based system, such as a neuro-symbolic artificial intelligence system. In one embodiment, such rules, such as grammatical rules, are generated without requiring the expertise of natural language processing. For example, in one embodiment, rule generator system 102 generates a parse tree based on analyzing a string of words, such as words in a sentence. A "parse tree," as used herein, refers to an ordered rooted tree that represents the syntactic structure of a string of words according to grammatical rules. A "grammatical rule," as used herein, refers to a linguistic rule for the syntax of grammatical utterances. Examples of parse trees being generating based on applying grammatical rules to a string of words will be discussed further below.

After generating a parse tree, such a parse tree may be displayed to a user of computing device 101, such as via the user interface of computing device 101. The user, in turn, may review the parse tree to determine if such a parse tree represents the appropriate syntactic structure of the string of words. If the user believes that the parse tree does not represent the appropriate syntactic structure of the string of words, then the user, who does not need to possess the expertise of natural language processing, may select the nodes and/or edges of the parse tree in a particular order corresponding to a marked annotation that corresponds to the correct syntactic structure of the string of words. For example, the user may hover the mouse cursor over the nodes and/or edges of the parse tree and select such nodes and/or edges with a corresponding mouse click. Such a marked annotation may be said to correspond to a "concept" that will be used by rule generator system 102 to generate a grammatical rule for generating a parse tree with such a concept.

In one embodiment, rule generator system 102 generates "generic" grammatical rules 104, which are used to train a rule-based system 105 (e.g., neuro-symbolic artificial intelligence system), such as to perform higher order natural language processing tasks, as discussed in further detail below. A "generic" grammatical rule, as used herein, refers to a rule that is based on a pattern (e.g., structural pattern of words captured in the parse tree) that is compliant with existing rules (grammatical rules). Such a pattern may be said to be a "generic" pattern which possesses the maximum coverage while being compliant with existing rules.

A description of the software components of rule generator system 102 used for generating rules to be utilized by a rule-based system is provided below in connection with FIG. 2. A description of the hardware configuration of rule generator system 102 is provided further below in connection with FIG. 4.

Furthermore, as illustrated in FIG. 1, system 100 includes a library 106 connected to rule generator system 102, where library 106 stores the rules (e.g., grammatical rules) and templates. A "library," as used herein, refers to a storage container (e.g., document-oriented database, document management system) used to store rules and templates. A "template," as used herein, refers to a file that includes the grammatical rule for generating a parse tree as well as the corresponding parse tree structure.

Additionally, as illustrated in FIG. 1, system 100 includes a database 107 connected to rule generator system 102, where database 107 stores a dictionary of terms along with their attributes, such as their corresponding parts of speech (e.g., noun, pronoun, verb, adjective, adverb, preposition, conjunction, interjection). In one embodiment, rule generator system 102 identifies the words in the received string of words in such a dictionary to identify their associated attributes (e.g., noun, verb). Such attributes are used by rule generator system 102 to correctly apply the grammatical rules to the received string of words so as to generate an appropriate parse tree that represents the syntactic structure of the received string of words.

System 100 is not to be limited in scope to any one particular network architecture. System 100 may include any number of computing devices 101, rule generator systems 102, networks 103, rule-based systems 105, libraries 106 and databases 107. Furthermore, while FIG. 1 illustrates rule-based system 102, library 106 and database 107 as being separate physical devices, some or all of the functionality of such devices may reside in a single device.

A discussion regarding the software components used by rule generator system 102 for generating rules to be utilized by a rule-based system is provided below in connection with FIG. 2.

Figure 2:
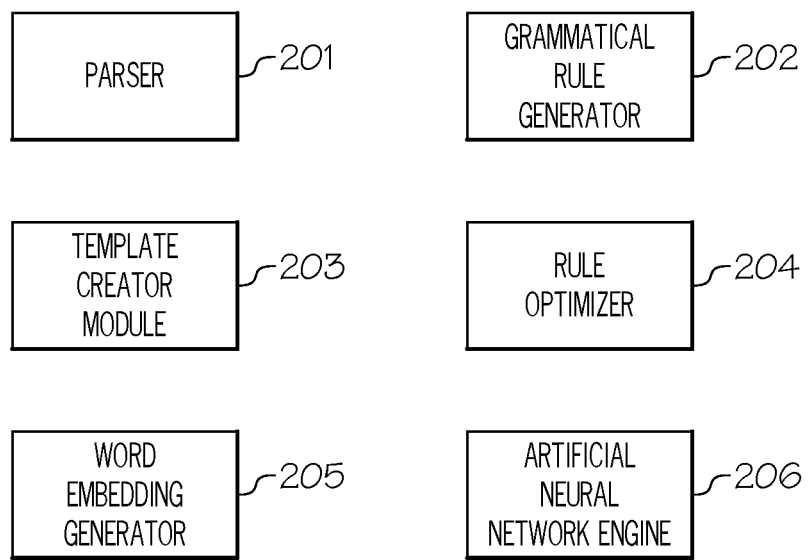
FIG. 2 is a diagram of the software components used by the rule generator system to generate rules to be utilized by a rule-based system in accordance with an embodiment of the present disclosure.

FIG. 2 is a diagram of the software components used by rule generator system 102 (FIG. 1) to generate rules (e.g., grammatical rules) to be utilized by a rule-based system (e.g., neuro-symbolic artificial intelligence system) in accordance with an embodiment of the present disclosure.

Referring to FIG. 2, in conjunction with FIG. 1, rule generator system 102 includes a parser 201 configured to build a data structure, such as a parse tree or other hierarchical structure, based on input data, such as a string of words, thereby providing a structural representation of the input while checking for correct syntax. That is, parser 201 is configured to parse a string of words into a parse tree based on rules, such as grammatical rules. A "parse tree," as used herein, refers to an ordered rooted tree that represents the syntactic structure of a string according to the grammatical rules. For example, in the sentence, "John hit the ball," parser 201 generates a parse tree as shown in FIG. 3 based on grammatical rules.

Figure 3:
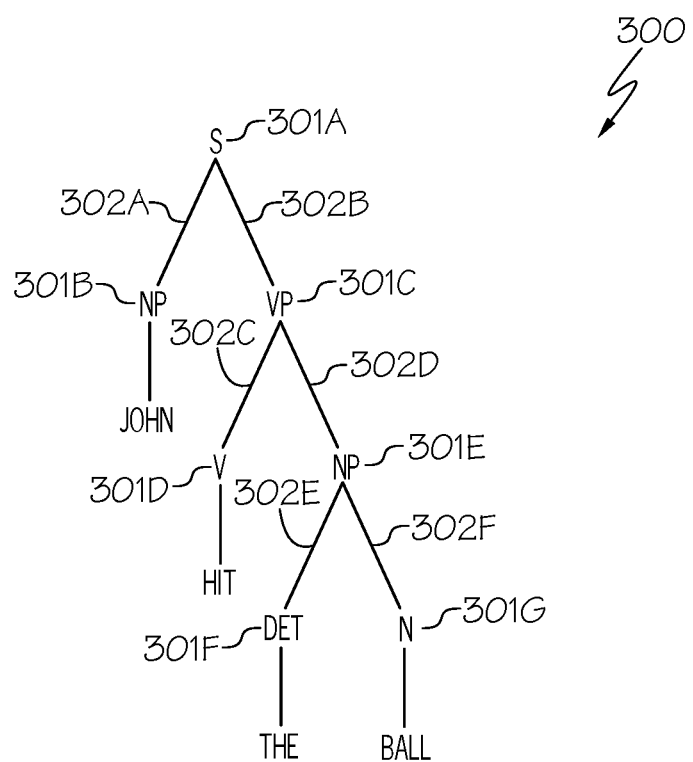
FIG. 3 illustrates an exemplary parse tree representing the syntactic structure of a string of words according to grammatical rules in accordance with an embodiment of the present disclosure.

FIG. 3 illustrates an exemplary parse tree representing the syntactic structure of a string of words according to grammatical rules in accordance with an embodiment of the present disclosure.

Referring to FIG. 3, parse tree 300 includes the root node 301A (identified as "S" for sentence) with edges 302A-B connecting root node 301A to branch nodes NP (noun phrase) 301B and VP (verb phrase) 301C. Branch node VP 301C is connected to leaf node V (verb) 301D via edge 302C and branch node VP 301C is connected to branch node NP (noun phase) 301E via edge 302D, which is connected to leaf node Det (determiner) 301F via edge 302E and leaf node N (noun) 301G via edge 302F. In the example sentence "John hit the ball," node NP 301B is associated with the term "John," node V 301D is associated with the term "hit," node Det 310F is associated with the term "the," and node N 301G is associated with the term "ball." Nodes 301A-301G may collectively or individually be referred to as nodes 301 or node 301, respectively. Edges 302A-302F may collectively or individually be referred to as edges 302 or edge 302, respectively.

Returning to FIG. 2, in conjunction with FIGS. 1 and 3, in one embodiment, parser 201 performs top-down parsing in which the left-most derivations of an input stream is found by searching for parse trees using a top-down expansion of the given grammar rules. Tokens (first stage is the token generation or lexical analysis, by which the input character stream is split into meaningful symbols defined by a grammar of regular expressions) are consumed from left to right. Inclusive choice is used to accommodate ambiguity (two different parse trees for the same string of words) by expanding all alternative right-hand sides of grammar rules.

In one embodiment, parser 201 performs bottom-up parsing in which parser 201 starts with the input and attempts to rewrite it to the start symbol. Intuitively, parser 201 attempts to locate the basic elements, then the elements containing these, and so on.

In one embodiment, parser 201 performs deep parsing in which the search strategy will give a complete syntactic structure to a sentence. Such a process is suitable for complex natural language processing applications (e.g., dialogue systems, summarization, etc.).

Examples of software tools utilized by parser 201 to analyze a received string of words according to grammatical rules to generate a parse tree include, but not limited to, ANTLR, Bison, Coco/R, LuZc, Parboiled, Parsec, Spirit Parser Framework, SYNTAX, etc.

Rule generator system 102 further includes a grammatical rule generator 202 configured to create a grammatical rule for parsing a string of words received by parser 201 based on a user selection of nodes and/or edges of the parse tree generated by parser 201 in a particular order.

In one embodiment, grammatical rule generator 202 displays the parse tree generated by parser 201 to the user of computing device 101, such as via the user interface of computing device 101. In one embodiment, the user, in turn, may review the parse tree to determine if such a parse tree represents the appropriate syntactic structure of the string of words that was received by parser 201, such as from the user. If the user believes that the parse tree does not represent the appropriate syntactic structure of the string, then the user, who does not need to possess the expertise of natural language processing, may select the nodes and/or edges of the parse tree in a particular order corresponding to a marked annotation that corresponds to the correct syntactic structure of the string of words. For example, the user may hover the mouse cursor over the nodes and/or edges of the parse tree and select such nodes and/or edges with a corresponding mouse click. Such a marked annotation may be said to correspond to a "concept" that will be used by grammatical rule generator 202 to generate a grammatical rule for generating a parse tree with such a concept. For example, the grammatical rule may include the rule that a sentence includes a noun phrase and a verb phrase; the verb phrase consists of a verb followed by a noun phrase; and a prepositional phrase consists of a preposition followed by the noun phrase.

In one embodiment, the particular nodes and/or edges of the parse tree selected by the user correspond to a format conversion of the parse tree. That is, such a selection by the user essentially corresponds to a new tree (e.g., abstract syntax tree), which is then traversed by grammatical rule generator 202 to construct a grammatical rule, such as via an abstract syntax tree interpreter or a parse tree walker. In one embodiment, the first node selected by the user corresponds to the "root" node. Each internal node represents a production rule and each leaf represents a token.

Examples of abstract syntax tree interpreters or parse tree walkers utilized by grammatical rule generator 202 to create a grammatical rule based on the user selection of nodes and/or edges of the parse tree include, but not limited to, ANTLR 3, Ragel, Parboiled, etc.

Rule generator system 102 further includes a template creator module 203 configured to create a template corresponding to the grammatical rule created by grammatical rule generator 202. A "template," as used herein, refers to a file that includes the grammatical rule for generating a parse tree as well as the corresponding parse tree structure. In one embodiment, the template further includes the words of the string and the associated parts of speech (e.g., noun phrase) that is associated with each of the nodes 301 in the parse tree.

In one embodiment, template creator module 203 assigns a template class to the created template so as to have members of the same generic type, i.e., members that have a similar grammatical rule.

In one embodiment, template creator module 203 generates a score corresponding to the grammatical rule associated with such a template. For example, the grammatical rule may include the rule that a sentence includes a noun phrase and a verb phrase; the verb phrase consists of a verb followed by a noun phrase; and a prepositional phrase consists of a preposition followed by the noun phrase. In one embodiment, the score generated by template creator module 203 is based on the syntactic structure of the string of words as well as the attributes of the words (e.g., parts of speech). In one embodiment, values are assigned to a sentence that begins with the noun phrase followed by the verb phrase that consists of a verb followed by the noun phrase and a prepositional phrase that consists of a preposition followed by the noun phrase via key-value pairs, which may be stored in a data structure (e.g., table) stored in a storage device of rule generator system 102. In such a data structure, the data structure stores various parts of speech identified by the order it appears in the syntactic structure of the string of words along with its associated value. For example, in the syntactic structure of the string of words, the sentence may first include a noun phrase followed by a verb phrase that consists of a verb followed by the noun phrase. In the data structure, such a noun phrase that is followed by such a verb phrase may be associated with a value. In one embodiment, template creator module 203 tabulates the total value of the grammatical rule based on the values assigned to each portion of the syntactic structure of the string of words. In one embodiment, template creator module 203 utilizes natural language processing to identify portions of the syntactic structure of the string of words from the grammatical rule associated with the template. In one embodiment, such a data structure is populated by an expert. In one embodiment, such a data structure is stored in a storage medium (e.g., memory, disk unit) of rule generator system 102.

In one embodiment, such a score is tagged to the created template. In one embodiment, such a score is normalized between the values of 0 and 1. In one embodiment, scores within a threshold degree of variance, which may be user-designated, are deemed to be in the same "class."

In one embodiment, the software tools utilized template creator module 203 to create a template corresponding to the grammatical rule created by grammatical rule generator 202 include, but not limited to, M-Files®, HotDocs®, etc.

Rule generator system 102 further includes a rule optimizer 204 configured to identify a set of templates stored in library 106 that is in the same class as the template created by template creator module 203. In one embodiment, such templates are deemed to be in the same class as the template created by template creator module 203 based on having a score within a threshold degree of difference as the score assigned to the template created by template creator module 203. In one embodiment, such a threshold difference is user-defined.

As discussed above, each template is a file that includes the grammatical rule for generating a parse tree and the corresponding parse tree structure. As a result, those templates that are identified as being in the same class as the template created by template creator module 203 are assumed to be associated with similar grammatical rules.

In one embodiment, rule optimizer 204 is configured to analyze the set of similar templates in connection with the marked annotation by the user. If the analyzed template does not include the marked annotation by the user, then the parse tree associated with the template is modified to include the marked annotation and the template is then modified to include such a modified parse tree. The modified template is then added to library 106.

For example, the marked annotation by the user may correspond to the grammatical rule of a sentence that includes a noun phrase followed by the verb phrase that consists of a verb followed by the noun phrase and a prepositional phrase that consists of a preposition followed by the noun phrase. Such a grammatical rule will be compared and contrasted with the grammatical rules associated with the set of similar templates.

For instance, a grammatical rule in one of the set of templates may only include a noun phrase followed by the verb phrase that consists of a verb followed by the noun phrase but does not include a preposition followed by the noun. As a result a new edge 302 and node 301 may be created in the parse tree associated with such a grammatical rule to include an edge 302 from the noun phase to the new node 301 corresponding to the preposition followed by the noun. In one embodiment, such an edge 302 is created via the logical OR operation.

In one embodiment, such differences between the previously stored templates and the template newly created by template creator module 203 are a new feature for node 301. For instance, the edges 302 and nodes 301 of the parse tree associated with a previously stored template and the template newly created by template creator module 203 may be the same except for a feature associated with an edge 302, such as the part of speech (e.g., pronoun as opposed to a noun). In such a scenario, the attribute associated with such a node 301 may now include the part of speech of a pronoun as well as the part of speech of a noun.

If, however, there is a match between the syntactic structure of the parse tree associated with the grammatical rule of a previously stored template and the user marked annotation, then the previously stored template will not be modified by rule optimizer 204. In such a scenario, in one embodiment, rule optimizer 204 determines if there are different words associated with such nodes 301 in the syntactic structure of the parse tree associated with the grammatical rule of a previously stored template and the user marked annotation. As previously discussed, the templates include the words of the string and the associated parts of speech (e.g., noun phrase) that are associated with each of the nodes 301 in the parse tree associated with the grammatical rule of the template. As a result, the words associated with each of the parts of the speech associated with each of the nodes 301 of the parse trees formed by the grammatical rules of the templates can be compared.

If there are different words associated with the same nodes 301 of the parse tree formed by the grammatical rules of the templates, then such words are added to the dictionary of terms along with their attributes (e.g., parts of speech, such as noun phrase) in database 107.

In one embodiment, the new word and its synset (set of synonyms that are interchangeable in some context), which may be obtained from WordNet (lexical database of semantic relations between words), are stored in the dictionary of terms along with their attributes in database 107. Such terms are stored in the dictionary of terms to assist with the future parsing of a future string of words by parser 201.

In one embodiment, only the lemma form is added to the dictionary of terms along with its attribute in database 107. A "lemma" form corresponds to the canonical form of a set of words that is used to index such a set of words. For example, the words break, breaks, broke, broken and breaking are forms of the same lexeme, with "break" as the lemma by which they are indexed.

Examples of software tools utilized by rule optimizer 204 to perform such operations include, but not limited to, JetBrains® MPS, Deuce, Eclipse® Xtext, etc.

Rule generator system 102 additionally includes a word embedding generator 205 configured to generate word embeddings based on the node and edge states of the parse trees associated with the set of templates that were identified as being in the same class as the template created by template creator module 203, including those that were modified. The "node state" of the parse tree associated with a template, as used herein, refers to the part of speech and the word associated with the part of speech. The "edge state" of the parse tree associated with a template, as used herein, refers to the connection between two nodes, which is used to portray the syntactic structure between such nodes (as well as the words associated with such nodes) in the parse tree. Such state information is used by word embedding generator 205 to generate word embeddings. A "word embedding," as used herein, refers to the representation of a word (obtained from the node states) for text analysis, such as in the form of a real-valued vector that encodes the meaning of the word such that the words that are closer in the vector space are expected to be similar in meaning. Such "word embeddings," as used herein, also include the relationship between multiple words (obtained from the edge state), such as in the form of a real-valued vector that encodes the syntactic structure between such words (e.g., noun-verb relationship).

Examples of software tools utilized by word embedding generator 205 to generate such word embeddings include, but not limited to, Word2Vec, FastText, Doc2Vec, BERT, SBERT, etc.

Furthermore, rule generator system 102 includes an artificial neural network engine 206 configured to generate generic grammatical rules by a neural network using the word embeddings discussed above.

A "neural network," or an "artificial neural network," as used herein, are computing systems inspired by the biological neural networks that constitute animal brains. An artificial neural network is based on a collection of connected units or nodes called artificial neurons, which loosely model the neurons in a biological brain. Each connection, like the synapses in a biological brain, can transmit a signal to other neurons. An artificial neuron receives a signal then processes it and can signal neurons connected to it. The "signal" at a connection is a real number, and the output of each neuron is computed by some non-linear function of the sum of its inputs. The connections are called edges. Neurons and edges typically have a weight that adjusts as learning proceeds. The weight increases or decreases the strength of the signal at a connection. Neurons may have a threshold such that a signal is sent only if the aggregate signal crosses that threshold. Typically, neurons are aggregated into layers. Different layers may perform different transformations on their inputs. Signals travel from the first layer (the input layer) to the last layer (the output layer), possibly after traversing the layers multiple times.

In one embodiment, the artificial neural network generates generic grammatical rules using the word embeddings. A "generic" grammatical rule, as used herein, refers to a rule that is based on a generic pattern that is compliant to existing rules. A pattern (structural pattern of words captured in the parse tree) may be said to be a "generic" pattern when it possesses the maximum coverage while being compliant with existing rules.

In one embodiment, the class of artificial neural network that is used to generate generic grammatical rules corresponds to a convolutional neural network (CNN).

In one embodiment, the CNN generates generic grammatical rules using two learners: an agent that learns by reinforcement (the reward is a match of generated rules with an output extraction), and a self-supervised model which trains the system with generated rules.

In one embodiment, the automated rule extraction can be posed as a reinforcement learning problem where the original input text (environment) is being manipulated by the agent (the rule) to obtain an attribute extracted (reward).

In one embodiment, such word embeddings, as discussed above, are used by artificial neural network engine 206 to generate generic grammatical rules using an artificial neural network (e.g., recurrent neural network). A recurrent neural network (RNN), as used herein, is a type of artificial neural network which uses sequential data or time series data. In the RNN, connections between nodes form a directed graph along a temporal sequence which allows it to exhibit temporal dynamic behavior. Furthermore, recurrent neural networks can use their internal state (memory) to process sequences of inputs. By utilizing such a network, a generic grammatical rule may result as discussed below.

For example, a recurrent neural network, such as the long short term memory (LSTM) recurrent neural network or the gated recurrent units (GRU) recurrent neural network, is used to generate a generic grammatical rule based on the recurrent neural network predicting the probability of the next word and edge in the syntactic structure based on the words and relationships between the words already observed in the sequence. In one embodiment, the recurrent neural network uses a distributed representation where different words with similar meanings have similar representation and uses a large context of recently observed words when making predictions (predicting the next part of speech for the next word and the relationship between other words in the generic grammatical rule).

A further description of these and other functions is provided below in connection with the discussion of the method for generating rules to be utilized by a rule-based system.

Prior to the discussion of the method for generating rules to be utilized by a rule-based system, a description of the hardware configuration of rule generator system 102 (FIG. 1) is provided below in connection with FIG. 4.

Figure 4:
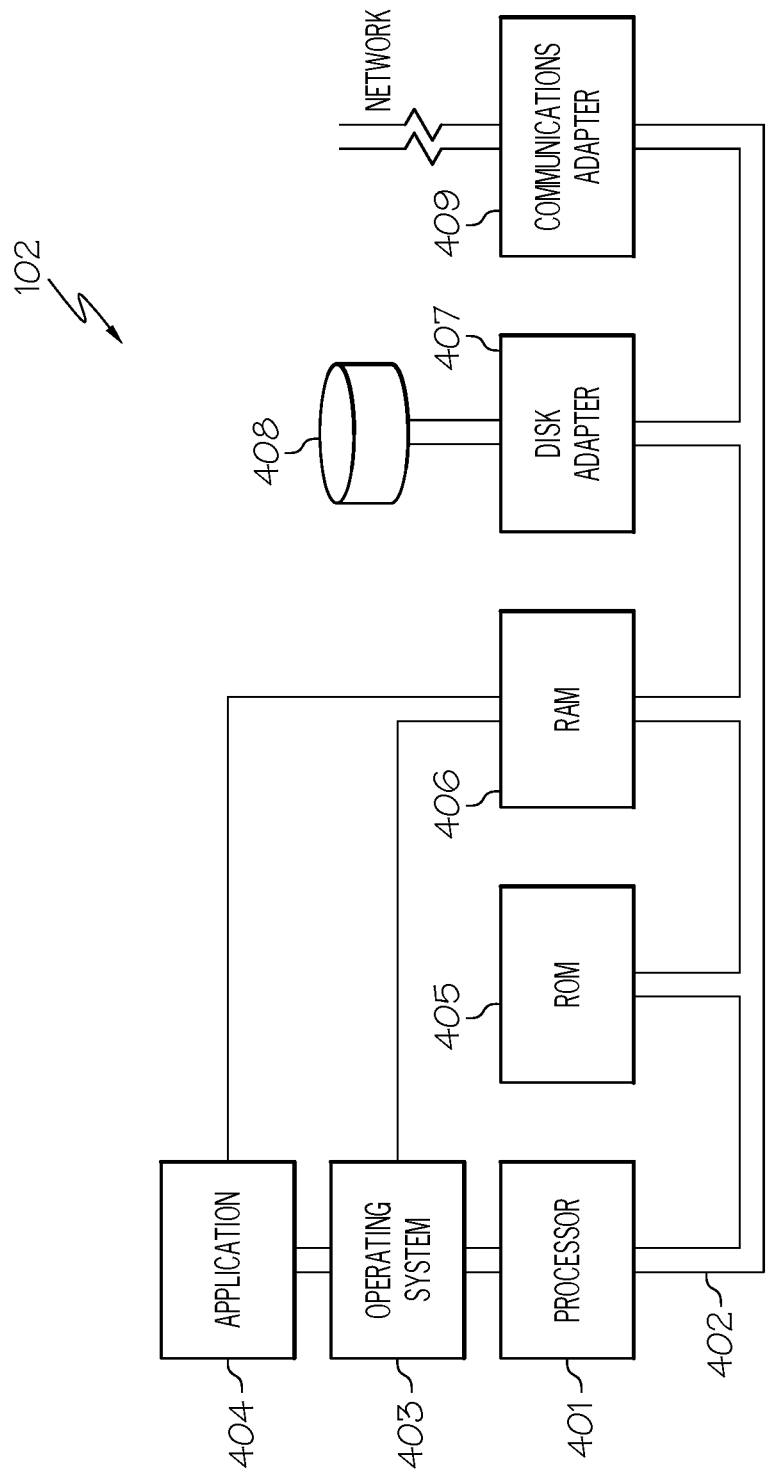
FIG. 4 illustrates an embodiment of the present disclosure of the hardware configuration of the rule generator system which is representative of a hardware environment for practicing the present disclosure.

Referring now to FIG. 4, FIG. 4 illustrates an embodiment of the present disclosure of the hardware configuration of rule generator system 102 (FIG. 1) which is representative of a hardware environment for practicing the present disclosure.

Rule generator system 102 has a processor 401 connected to various other components by system bus 402. An operating system 403 runs on processor 401 and provides control and coordinates the functions of the various components of FIG. 4. An application 404 in accordance with the principles of the present disclosure runs in conjunction with operating system 403 and provides calls to operating system 403 where the calls implement the various functions or services to be performed by application 404. Application 404 may include, for example, parser 201 (FIG. 2), grammatical rule generator 202 (FIG. 2), template creator module 203 (FIG. 2), rule optimizer 204 (FIG. 2), word embedding generator 205 (FIG. 2) and artificial neural network engine 206 (FIG. 2). Furthermore, application 404 may include, for example, a program for generating rules to be utilized by a rule-based system as discussed further below in connection with FIGS. 5-8.

Referring again to FIG. 4, read-only memory ("ROM") 405 is connected to system bus 402 and includes a basic input/output system ("BIOS") that controls certain basic functions of rule generator system 102. Random access memory ("RAM") 406 and disk adapter 407 are also connected to system bus 402. It should be noted that software components including operating system 403 and application 404 may be loaded into RAM 406, which may be rule generator system's 102 main memory for execution. Disk adapter 407 may be an integrated drive electronics ("IDE") adapter that communicates with a disk unit 408, e.g., disk drive. It is noted that the program for generating rules to be utilized by a rule-based system, as discussed further below in connection with FIGS. 5-8, may reside in disk unit 408 or in application 404.

Rule generator system 102 may further include a communications adapter 409 connected to bus 402. Communications adapter 409 interconnects bus 402 with an outside network (e.g., network 103 of FIG. 1) to communicate with other devices, such as computing device 101 of FIG. 1.

In one embodiment, application 404 of rule generator system 102 includes the software components of parser 201, grammatical rule generator 202, template creator module 203, rule optimizer 204, word embedding generator 205 and artificial neural network engine 206. In one embodiment, such components may be implemented in hardware, where such hardware components would be connected to bus 402. The functions discussed above performed by such components are not generic computer functions. As a result, rule generator system 102 is a particular machine that is the result of implementing specific, non-generic computer functions.

In one embodiment, the functionality of such software components (e.g., parser 201, grammatical rule generator 202, template creator module 203, rule optimizer 204, word embedding generator 205 and artificial neural network engine 206) of rule generator system 102, including the functionality for generating rules to be utilized by a rule-based system, may be embodied in an application specific integrated circuit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, a rule-based system is used to store and manipulate knowledge to interpret information in a useful way. It is often used in artificial intelligence applications and research. An example of a rule-based system is a text-based system that exploits the grammatical rules to parse a string of words into a parse tree by a parser based on such grammatical rules. A parse tree is an ordered rooted tree that represents the syntactic structure of a string according to the grammatical rules. As a result, a parse tree may represent a real-word construction, such as a sentence. Such a parse tree may then be utilized by a compiler to generate machine code. Unfortunately, in order to design such rule-based systems, natural language processing expertise is required to develop the grammatical rules that are used to build the parse tree.

Figure 5:
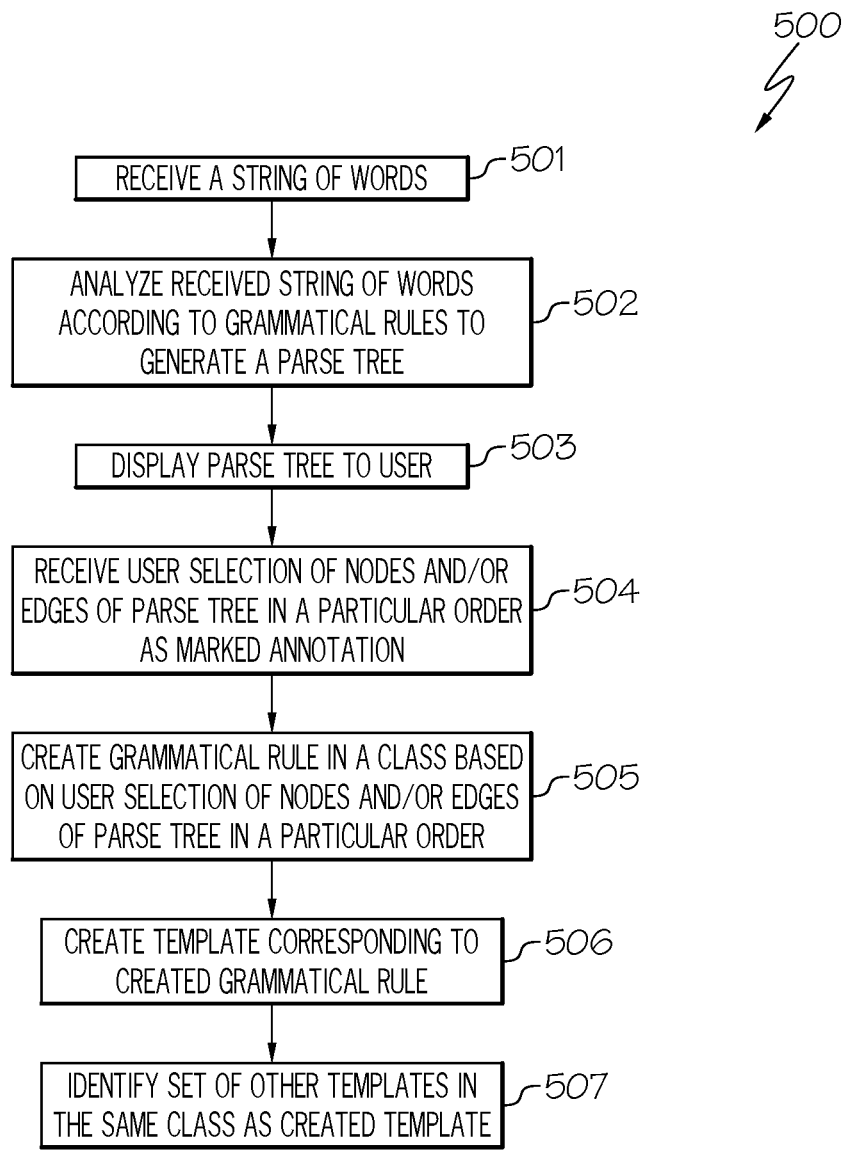
FIG. 5 is a flowchart of a method for creating a grammatical rule based on the user's marked annotation in accordance with an embodiment of the present disclosure.
Figure 6:
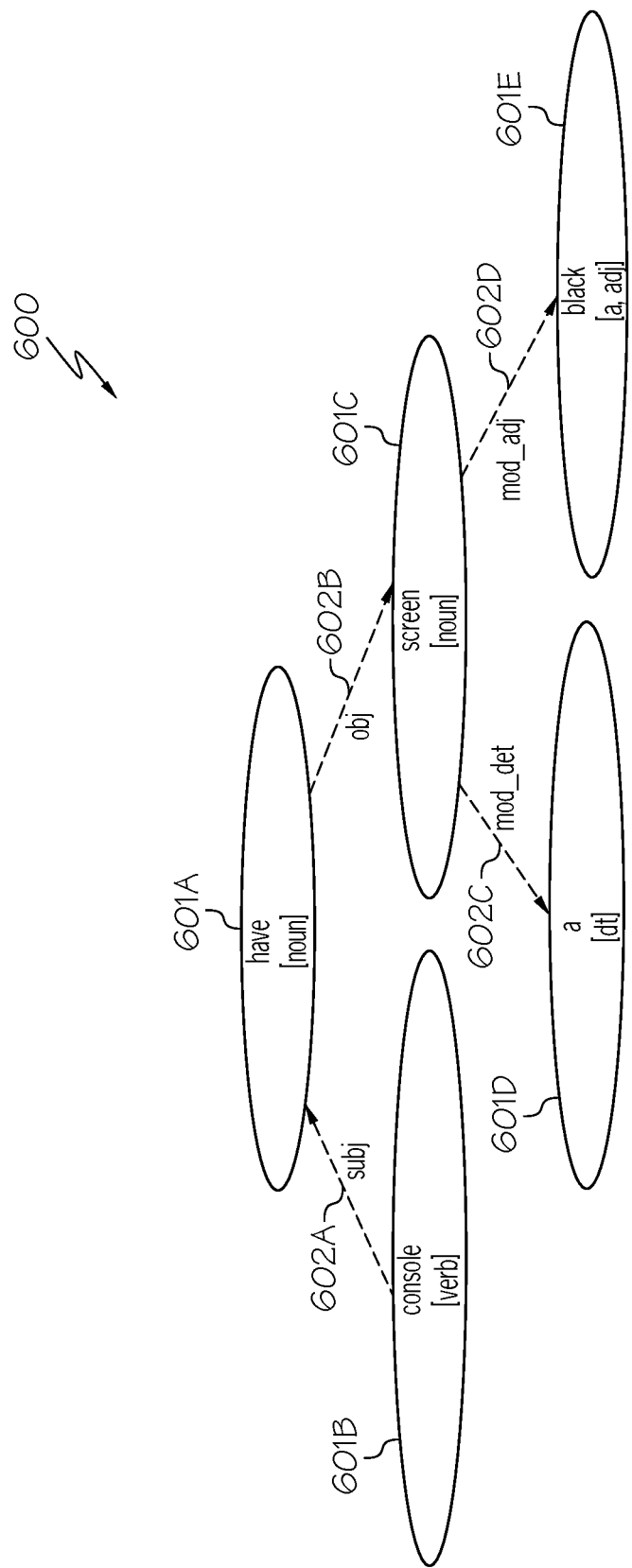
FIG. 6 is an exemplary illustration of a parse tree and corresponding pattern in accordance with an embodiment of the present disclosure.
Figure 7:
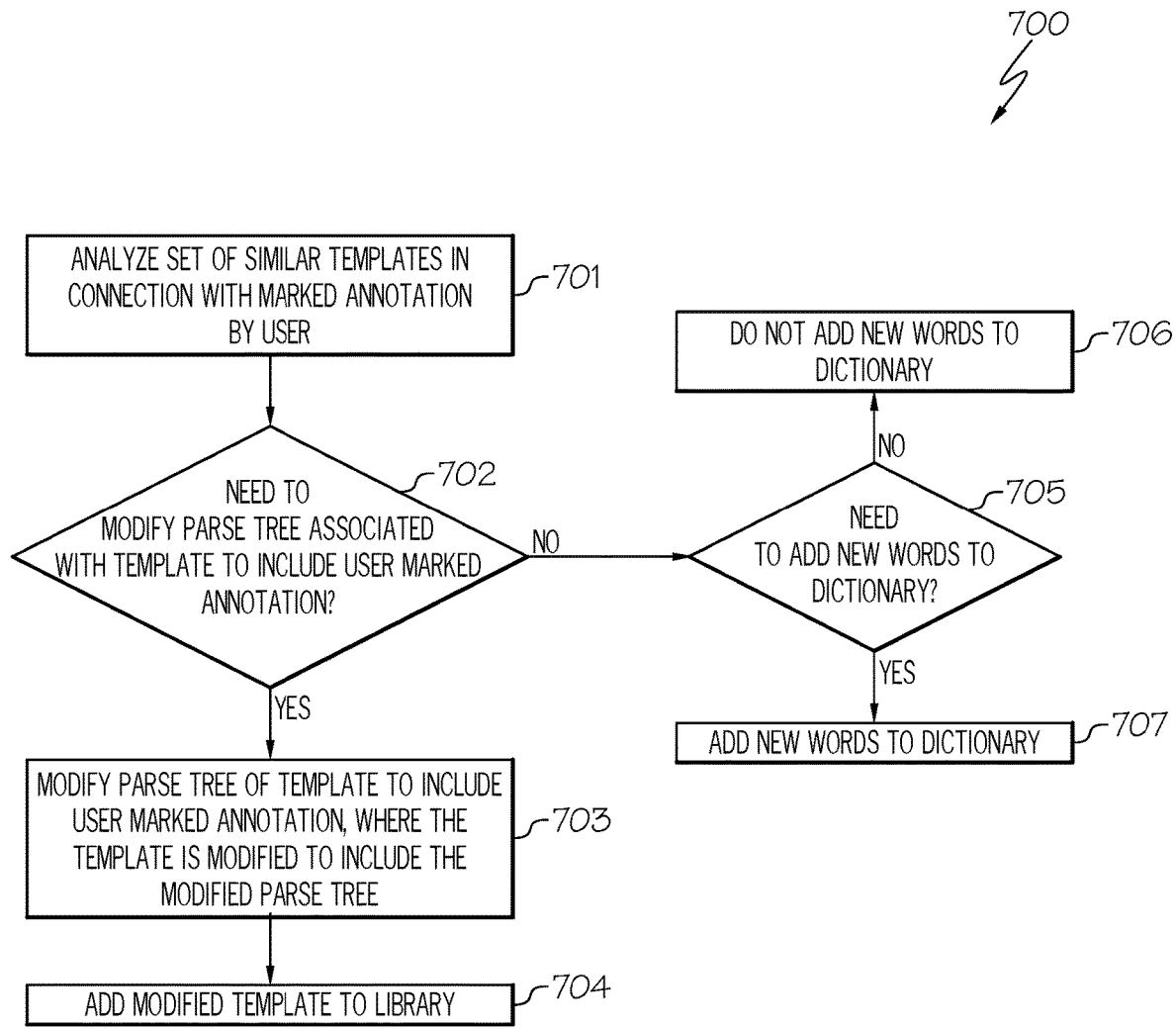
FIG. 7 is a flowchart of a method for rule optimization in accordance with an embodiment of the present disclosure.
Figure 8:
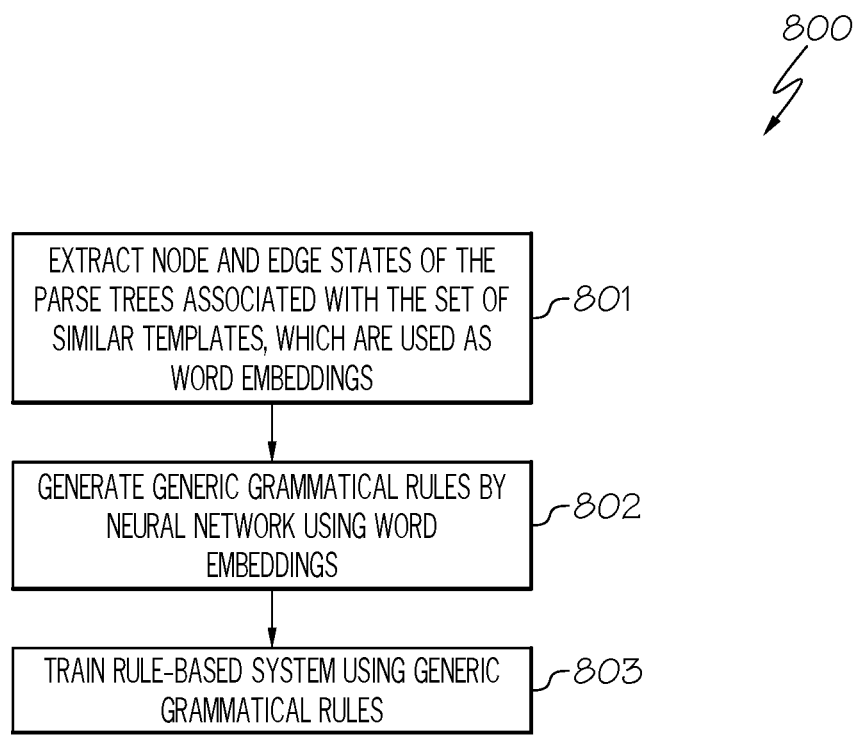
FIG. 8 is a flowchart of a method for generating generic grammatical rules to train a rule-based system in accordance with an embodiment of the present disclosure.

The embodiments of the present disclosure provide a means for developing the grammatical rules to be utilized by a rule-based system, such as to build parse trees, without requiring the expertise of natural language processing as discussed below in connection with FIGS. 5-8. FIG. 5 is a flowchart of a method for creating a grammatical rule based on the user's marked annotation. FIG. 6 is an exemplary illustration of a parse tree and corresponding pattern. FIG. 7 is a flowchart of a method for rule optimization. FIG. 8 is a flowchart of a method for generating generic grammatical rules to train a rule-based system.

As stated above, FIG. 5 is a flowchart of a method 500 for creating a grammatical rule based on the user's marked annotation in accordance with an embodiment of the present disclosure.

Referring to FIG. 5, in conjunction with FIGS. 1-4, in step 501, parser 201 of rule generator system 102 receives a string of words, such as from the user of computing device 101.

In step 502, parser 201 of rule generator system 102 analyzes the received string of words according to grammatical rules to generate a parse tree.

As previously discussed, parser 201 is configured to build a data structure, such as a parse tree or other hierarchical structure, based on input data, such as a string of words, thereby providing a structural representation of the input while checking for correct syntax. That is, parser 201 is configured to parse a string of words into a parse tree based on rules, such as grammatical rules. A "parse tree," as used herein, refers to an ordered rooted tree that represents the syntactic structure of a string according to the grammatical rules. For example, in the sentence, "Console has a black screen," parser 201 generates a parse tree as shown in FIG. 6 based on grammatical rules.

FIG. 6 is an exemplary illustration of a parse tree and corresponding pattern in accordance with an embodiment of the present disclosure.

Referring to FIG. 6, parse tree 600 includes the node 601A (noun) associated with the term "have," which is the lemma of the term "has." Such an indication is incorrect as the term "have" is actually the "verb" of the sentence as opposed to the "noun." Parse tree 600 further includes node 601B (verb) associated with the term "console," which is the connected to node 601A as node 601A represents the subject (identified as "subj" in FIG. 6) of the verb "console" as shown in edge 602A. Such an indication is incorrect as the term "console" is actually a "noun" and is the subject of the sentence. Such incorrect indications may be corrected by a user indicating such an error via the user's marked annotation as discussed further below.

Furthermore, parse tree 600 includes node 601C (noun) associated with the term "screen," which is connected to node 601A as node 601C represents the object (identified as "obj" in FIG. 6) of the verb "have" as shown in edge 602B. Additionally, parse tree 600 includes node 601D (determiner, which is identified as "dt" in FIG. 6) associated with the term "a," which is connected to node 601C as node 601D represents the determiner which modifies the noun "screen" as shown in edge 602C (identified as "mod_det"). Furthermore, parse tree 600 includes node 601E (adj) associated with the term "black," which is connected to node 601C as node 601E represents the adjective which modifies the noun "screen" as shown in edge 602D (identified as "mod_adj"). It is noted that node 601E indicates that the term "black" is not only an adjective but that it includes a determiner ("a") at the beginning of the adjective group.

FIG. 6 also illustrates the pattern of parse tree 600 which represents the structural pattern of words captured in parse tree 600. For example, the pattern of parse tree 600 is the following:
Pattern=np(have)_master_console->var0[hasLemmaForm ("have"), hasParseFeature("noun")] {obj>var1[hasLemmaForm("screen"), hasParseFeature("verb")]{mod_nadj>var2 [hasLemmaForm("black"), hasParseFeature("adj")]}

Such a pattern may be modified by a user (e.g., user of computing device 101) upon being presented the parse tree as discussed further below.

Returning to FIG. 5, in conjunction with FIGS. 1-4 and 6, as discussed above, in one embodiment, parser 201 performs top-down parsing in which the left-most derivations of an input stream is found by searching for parse trees using a top-down expansion of the given grammar rules. Tokens (first stage is the token generation or lexical analysis, by which the input character stream is split into meaningful symbols defined by a grammar of regular expressions) are consumed from left to right. Inclusive choice is used to accommodate ambiguity (two different parse trees for the same string of words) by expanding all alternative right-hand sides of grammar rules.

In one embodiment, parser 201 performs bottom-up parsing in which parser 201 starts with the input and attempts to rewrite it to the start symbol. Intuitively, parser 201 attempts to locate the basic elements, then the elements containing these, and so on.

In one embodiment, parser 201 performs deep parsing in which the search strategy will give a complete syntactic structure to a sentence. Such a process is suitable for complex natural language processing applications (e.g., dialogue systems, summarization, etc.).

Examples of software tools utilized by parser 201 to analyze a received string of words according to grammatical rules to generate a parse tree include, but not limited to, ANTLR, Bison, Coco/R, LuZc, Parboiled, Parsec, Spirit Parser Framework, SYNTAX, etc.

In step 503, grammatical rule generator 202 of rule generator system 102 displays the parse tree (parse tree generated in step 502) to the user (e.g., user of computing device 101), such as via the user interface of computing device 101.

In step 504, grammatical rule generator 202 of rule generator system 102 receives a user selection of the nodes and/or edges of the parse tree in a particular order corresponding to a marked annotation to convey a concept.

In step 505, grammatical rule generator 202 of rule generator system 102 creates a grammatical rule in a class based on the user selection of the nodes and/or edges of the parse tree in a particular order.

As discussed above, in one embodiment, grammatical rule generator 202 displays the parse tree generated by parser 201 to the user of computing device 101, such as via the user interface of computing device 101. In one embodiment, the user, in turn, may review the parse tree to determine if such a parse tree represents the appropriate syntactic structure of the string of words that was received by parser 201, such as from the user. If the user believes that the parse tree does not represent the appropriate syntactic structure of the string, then the user, who does not need to possess the expertise of natural language processing, may select the nodes and/or edges of the parse tree in a particular order corresponding to a marked annotation that corresponds to the correct syntactic structure of the string of words. Such a marked annotation may be said to correspond to a "concept" that will be used by grammatical rule generator 202 to generate a grammatical rule for generating a parse tree with such a concept. For example, the grammatical rule may include the rule that a sentence includes a noun phrase and a verb phrase; the verb phrase consists of a verb followed by a noun phrase; and a prepositional phrase consists of a preposition followed by the noun phrase.

In one embodiment, the particular nodes and/or edges of the parse tree selected by the user correspond to a format conversion of the parse tree. That is, such a selection by the user essentially corresponds to a new tree (e.g., abstract syntax tree), which is then traversed by grammatical rule generator 202 to construct a grammatical rule, such as via an abstract syntax tree interpreter or a parse tree walker. In one embodiment, the first node selected by the user corresponds to the "root" node. Each internal node represents a production rule and each leaf represents a token.

Examples of abstract syntax tree interpreters or parse tree walkers utilized by grammatical rule generator 202 to create a grammatical rule based on the user selection of nodes and/or edges of the parse tree include, but not limited to, ANTLR 3, Ragel, Parboiled, etc.

Referring to the example of FIG. 6, upon receipt of parse tree 600, the user (e.g., user of computing device 101) may select node 601B followed by the selection of edge 602A followed by the selection of node 601A to indicate that the term "console" is the noun/subject of the sentence with the term "has" (lemma being "have") corresponding to the verb of the sentence. As a result, the user is indicating that node 601B represents a "noun" for the term "console," which is the subject (edge 602A should be pointing towards node 601B as opposed to node 601A) and that node 601A represents a "verb" for the term "has" (lemma being "have").

As a result, the pattern would then be modified as:
Pattern=vp(have)_master_console->var0[hasLemmaForm ("have"), hasParseFeature("verb")] {obj>var1[hasLemmaForm("screen"), hasParseFeature("noun")]{mod_nadj>var2 [hasLemmaForm("black"), hasParseFeature("adj")]}}

Such a pattern corresponds to the grammatical rule that is used to generate a parse tree that includes the user's marked annotation.

In step 506, template creator module 203 of rule generator system 102 creates a template corresponding to the created grammatical rule (grammatical rule created in step 505).

As stated above, a "template," as used herein, refers to a file that includes the grammatical rule for generating a parse tree as well as the corresponding parse tree structure. In one embodiment, the template further includes the words of the string and the associated parts of speech (e.g., noun phrase) that is associated with each of the nodes (e.g., nodes 301) in the parse tree.

In one embodiment, template creator module 203 assigns a template class to the created template so as to have members of the same generic type, i.e., members that have a similar grammatical rule.

In one embodiment, template creator module 203 generates a score corresponding to the grammatical rule associated with such a template. For example, the grammatical rule may include the rule that a sentence includes a noun phrase and a verb phrase; the verb phrase consists of a verb followed by a noun phrase; and a prepositional phrase consists of a preposition followed by the noun phrase. In one embodiment, the score generated by template creator module 203 is based on the syntactic structure of the string of words as well as the attributes of the words (e.g., parts of speech). In one embodiment, values are assigned to a sentence that begins with the noun phrase followed by the verb phrase that consists of a verb followed by the noun phrase and a prepositional phrase that consists of a preposition followed by the noun phrase via key-value pairs, which may be stored in a data structure (e.g., table) stored in a storage device (e.g., memory 405, disk unit 408) of rule generator system 102. In such a data structure, the data structure stores various parts of speech identified by the order it appears in the syntactic structure of the string of words along with its associated value. For example, in the syntactic structure of the string of words, the sentence may first include a noun phrase followed by a verb phrase that consists of a verb followed by the noun phrase. In the data structure, such a noun phrase that is followed by such a verb phrase may be associated with a value. In one embodiment, template creator module 203 tabulates the total value of the grammatical rule based on the values assigned to each portion of the syntactic structure of the string of words. In one embodiment, template creator module 203 utilizes natural language processing to identify portions of the syntactic structure of the string of words from the grammatical rule associated with the template. In one embodiment, such a data structure is populated by an expert. In one embodiment, such a data structure is stored in a storage medium (e.g., memory 405, disk unit 408) of rule generator system 102.

In one embodiment, such a score is tagged to the created template. In one embodiment, such a score is normalized between the values of 0 and 1. In one embodiment, scores within a threshold degree of variance, which may be user-designated, are deemed to be in the same "class."

In one embodiment, the software tools utilized template creator module 203 to create a template corresponding to the grammatical rule created by grammatical rule generator 202 include, but not limited to, M-Files®, HotDocs®, etc.

In step 507, rule optimizer 204 of rule generator system 102 identifies a set of other templates in the same class as the created template (referred to herein as the set of "similar" templates).

As discussed above, in one embodiment, such templates are deemed to be in the same class as the template created by template creator module 203 based on having a score within a threshold degree of difference as the score assigned to the template created by template creator module 203. In one embodiment, such a threshold difference is user-defined.

As discussed above, each template is a file that includes the grammatical rule for generating a parse tree. As a result, those templates that are identified as being in the same class as the template created by template creator module 203 are assumed to be associated with similar grammatical rules.

Upon identifying such a set of templates in the same class as the created template, an analysis of such templates may be performed in connection with the user's marked annotation to determine if such templates include the user's marked annotation as discussed below in connection with FIG. 7.

FIG. 7 is a flowchart of a method 700 for rule optimization in accordance with an embodiment of the present disclosure.

Referring to FIG. 7, in conjunction with FIGS. 1-6, in step 701, rule optimizer 204 of rule generator system 102 analyzes the set of similar templates (set of templates in the same class as the created template) in connection with the marked annotation by the user.

In step 702, rule optimizer 204 of rule generator system 102 determines whether there is a need to modify a parse tree associated with the template to include the user marked annotation.

If there is a need to modify the parse tree associated with the template to include the user marked annotation, then, in step 703, rule optimizer 204 of rule generator system 102 modifies the parse tree of the template to include the user marked annotation, where the template is modified to include the modified parse tree.

In step 704, rule optimizer 204 of rule generator system 102 adds the modified template to library 106.

As stated above, in one embodiment, rule optimizer 204 is configured to analyze the set of similar templates in connection with the marked annotation by the user. If the analyzed template does not include the marked annotation by the user, then the parse tree associated with the template is modified to include the marked annotation and the template is then modified to include such a modified parse tree. The modified template is then added to library 106.

For example, the marked annotation by the user may correspond to the grammatical rule of a sentence that includes a noun phrase followed by the verb phrase that consists of a verb followed by the noun phrase and a prepositional phrase that consists of a preposition followed by the noun phrase. Such a grammatical rule will be compared and contrasted with the grammatical rules associated with the set of similar templates.

For instance, a grammatical rule in one of the set of templates may only include a noun phrase followed by the verb phrase that consists of a verb followed by the noun phrase but does not include a preposition followed by the noun. As a result a new edge 302 and node 301 may be created in the parse tree associated with such a grammatical rule to include an edge 302 from the noun phase to the new node 301 corresponding to the preposition followed by the noun. In one embodiment, such an edge 302 is created via the logical OR operation.

In one embodiment, such differences between the previously stored templates and the template newly created by template creator module 203 are a new feature for node 301. For instance, the edges 302 and nodes 301 of the parse tree associated with a previously stored template and the template newly created by template creator module 203 may be the same except for a feature associated with an edge 302, such as the part of speech (e.g., pronoun as opposed to a noun). In such a scenario, the attribute associated with such a node 301 may now include the part of speech of a pronoun as well as the part of speech of a noun.

Referring again to step 702, if, however, there is no need to modify the parse tree associated with the template to include the user marked annotation, then, in step 705, rule optimizer 204 of rule generator system 102 determines whether there is a need to add new words to a dictionary.

If there is no need to add new words to a dictionary, then, in step 706, rule optimizer 204 of rule generator system 102 does not add new words to the dictionary.

If, however there is a need to add new words to a dictionary, then, in step 707, rule optimizer 204 of rule generator system 102 adds new words to the dictionary.

As discussed above, if there is a match between the syntactic structure of the parse tree associated with the grammatical rule of a previously stored template and the user marked annotation, then the previously stored template will not be modified by rule optimizer 204. In such a scenario, in one embodiment, rule optimizer 204 determines if there are different words associated with such nodes 301 in the syntactic structure of the parse tree associated with the grammatical rule of a previously stored template and the user marked annotation. As previously discussed, the templates include the words of the string and the associated parts of speech (e.g., noun phrase) that are associated with each of the nodes 301 in the parse tree associated with the grammatical rule of the template. As a result, the words associated with each of the parts of the speech associated with each of the nodes 301 of the parse trees formed by the grammatical rules of the templates can be compared.

If there are different words associated with the same nodes 301 of the parse tree formed by the grammatical rules of the templates, then such words are added to the dictionary of terms along with their attributes (e.g., parts of speech, such as noun phrase) in database 107.

In one embodiment, the new word and its synset (set of synonyms that are interchangeable in some context), which may be obtained from WordNet (lexical database of semantic relations between words), are stored in the dictionary of terms along with their attributes in database 107. Such terms are stored in the dictionary of terms to assist with the future parsing of a future string of words by parser 201.

In one embodiment, only the lemma form is added to the dictionary of terms along with its attribute in database 107. A "lemma" form corresponds to the canonical form of a set of words that is used to index such a set of words. For example, the words break, breaks, broke, broken and breaking are forms of the same lexeme, with "break" as the lemma by which they are indexed.

Examples of software tools utilized by rule optimizer 204 to perform such operations include, but not limited to, JetBrains® MPS, Deuce, Eclipse® Xtext, etc.

After analyzing the set of similar templates in connection with the user's marked annotation as discussed above, the node and edge states of the parse tree associated with such templates are used to generate "generic" grammatical rules to train a rule-based system as discussed below in connection with FIG. 8.

FIG. 8 is a flowchart of a method 800 for generating generic grammatical rules to train a rule-based system in accordance with an embodiment of the present disclosure.

Referring to FIG. 8, in conjunction with FIGS. 1-7, in step 801, word embedding generator 205 of rule generator system 102 extracts the node and edge states of the parse trees associated with the set of similar templates to be used as word embeddings.

As stated above, word embedding generator 205 is configured to generate word embeddings based on the node and edge states of the parse trees associated with the set of templates that were identified as being in the same class as the template created by template creator module 203, including those that were modified. The "node state" of the parse tree associated with a template, as used herein, refers to the part of speech and the word associated with the part of speech. The "edge state" of the parse tree associated with a template, as used herein, refers to the connection between two nodes, which is used to portray the syntactic structure between such nodes (as well as the words associated with such nodes) in the parse tree. Such state information is used by word embedding generator 205 to generate word embeddings. A "word embedding," as used herein, refers to the representation of a word (obtained from the node states) for text analysis, such as in the form of a real-valued vector that encodes the meaning of the word such that the words that are closer in the vector space are expected to be similar in meaning. Such "word embeddings," as used herein, also include the relationship between multiple words (obtained from the edge state), such as in the form of a real-valued vector that encodes the syntactic structure between such words (e.g., noun-verb relationship).

Examples of software tools utilized by word embedding generator 205 to generate such word embeddings include, but not limited to, Word2Vec, FastText, Doc2Vec, BERT, SBERT, etc.

In step 802, artificial neural network engine 206 of rule generator system 102 generates generic grammatical rules by a neural network using the word embeddings.

As discussed above, a "neural network," or an "artificial neural network," as used herein, are computing systems inspired by the biological neural networks that constitute animal brains. An artificial neural network is based on a collection of connected units or nodes called artificial neurons, which loosely model the neurons in a biological brain. Each connection, like the synapses in a biological brain, can transmit a signal to other neurons. An artificial neuron receives a signal then processes it and can signal neurons connected to it. The "signal" at a connection is a real number, and the output of each neuron is computed by some non-linear function of the sum of its inputs. The connections are called edges. Neurons and edges typically have a weight that adjusts as learning proceeds. The weight increases or decreases the strength of the signal at a connection. Neurons may have a threshold such that a signal is sent only if the aggregate signal crosses that threshold. Typically, neurons are aggregated into layers. Different layers may perform different transformations on their inputs. Signals travel from the first layer (the input layer) to the last layer (the output layer), possibly after traversing the layers multiple times.

In one embodiment, the artificial neural network generates generic grammatical rules using the word embeddings.

A "generic" grammatical rule, as used herein, refers to a rule that is based on a generic pattern that is compliant to existing rules.

In one embodiment, the class of artificial neural network that is used to generate generic grammatical rules corresponds to a convolutional neural network (CNN).

In one embodiment, the CNN generates generic grammatical rules using two learners: an agent that learns by reinforcement (the reward is a match of generated rules with an output extraction), and a self-supervised model which trains the system with generated rules.

In one embodiment, the automated rule extraction can be posed as a reinforcement learning problem where the original input text (environment) is being manipulated by the agent (the rule) to obtain an attribute extracted (reward).

In one embodiment, such word embeddings, as discussed above, are used by artificial neural network engine 206 to generate generic grammatical rules using an artificial neural network (e.g., recurrent neural network). A recurrent neural network (RNN), as used herein, is a type of artificial neural network which uses sequential data or time series data. In the RNN, connections between nodes form a directed graph along a temporal sequence which allows it to exhibit temporal dynamic behavior. Furthermore, recurrent neural networks can use their internal state (memory) to process sequences of inputs. By utilizing such a network, a generic grammatical rule may result as discussed below.

For example, a recurrent neural network, such as the long short term memory (LSTM) recurrent neural network or the gated recurrent units (GRU) recurrent neural network, is used to generate a generic grammatical rule based on the recurrent neural network predicting the probability of the next word and edge in the syntactic structure based on the words and relationships between the words already observed in the sequence. In one embodiment, the recurrent neural network uses a distributed representation where different words with similar meanings have similar representation and uses a large context of recently observed words when making predictions (predicting the next part of speech for the next word and the relationship between other words in the generic grammatical rule).

In step 803, artificial neural network engine 206 of rule generator system 102 trains a rule-based system (e.g., neuro-symbolic artificial intelligence system) using the generic grammatical rules, such as to perform higher order natural language processing tasks. For example, such a rule-based system may be trained for automatic grammar correction using such generic grammatical rules, where documents can be automatically corrected for grammar based on such generic grammatical rules.

In such an embodiment, such training is accomplished using the generic grammatical rules as the "training data" to train a mathematical model to predict the grammar corrections.

In one embodiment, artificial neural network engine 206 uses a machine learning algorithm (e.g., supervised learning) to build a mathematical model based on sample data consisting of generic grammatical rules. Such a data set is referred to herein as the "training data" which is used by the machine learning algorithm to make predictions or decisions of grammar corrections. In one embodiment, the training data consists of generic grammatical rules. The algorithm iteratively makes predictions on the training data as to grammar corrections on a document, string of words, etc. Examples of such supervised learning algorithms include nearest neighbor, Naïve Bayes, decision trees, linear regression, support vector machines and neural networks.

In one embodiment, the mathematical model (machine learning model) corresponds to a classification model trained to predict the grammar corrections.

In this manner, grammatical rules are developed to be utilized by a rule-based system, such as to build parse trees, without requiring the expertise of natural language processing. Furthermore, such grammatical rules may be generic grammatical rules based on a generic pattern that are compliant to existing rules.

Furthermore, the principles of the present disclosure improve the technology or technical field involving rule-based systems.

As discussed above, a rule-based system is used to store and manipulate knowledge to interpret information in a useful way. It is often used in artificial intelligence applications and research. An example of a rule-based system is a text-based system that exploits the grammatical rules to parse a string of words into a parse tree by a parser based on such grammatical rules. A parse tree is an ordered rooted tree that represents the syntactic structure of a string according to the grammatical rules. As a result, a parse tree may represent a real-word construction, such as a sentence. Such a parse tree may then be utilized by a compiler to generate machine code. Unfortunately, in order to design such rule-based systems, natural language processing expertise is required to develop the grammatical rules that are used to build the parse tree.

Embodiments of the present disclosure improve such technology by analyzing a received string of words by a parser according to grammatical rules to generate a parse tree. A "parse tree," as used herein, refers to an ordered rooted tree that represents the syntactic structure of a string of words according to the grammatical rules. The parse tree may then be displayed to a user, such as a user of a computing device, via a user interface of the computing device. The user, in turn, may review the parse tree to determine if such a parse tree represents the appropriate syntactic structure of the string of words that was received by the parser. If the user believes that the parse tree does not represent the appropriate syntactic structure of the string of words, then the user, who does not need to possess the expertise of natural language processing, may select the nodes and/or edges of the parse tree in a particular order corresponding to a marked annotation that corresponds to the correct syntactic structure of the string of words. Such a marked annotation may be said to correspond to a "concept" that will be used to create a grammatical rule for generating a parse tree with such a concept. That is, a grammatical rule for parsing the string of words based on the user selection of nodes and/or edges of the parse tree in a particular order is created. In one embodiment, the particular nodes and/or edges of the parse tree selected by the user correspond to a format conversion of the parse tree. That is, such a selection by the user essentially corresponds to a new tree (e.g., abstract syntax tree), which is then traversed to construct a grammatical rule, such as via an abstract syntax tree interpreter or a parse tree walker. In this manner, grammatical rules are developed to be utilized by a rule-based system, such as to build parse trees, without requiring the expertise of natural language processing. Furthermore, in this manner, there is an improvement in the technical field involving rule-based systems.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for generating rules to be utilized by a rule-based system, the method comprising:
   extracting, by a word embedding generator, node states and edge states from parse trees;
   generating, by said word embedding generator, word embeddings based on said extracted node states and edge states;
   generating, by an artificial neural network engine, generic grammatical rules by a neural network using said word embeddings; and
   training, by said artificial neural network engine, said rule-based system using said generic grammatical rules.

2. The method as recited in claim 1 further comprising:
   receiving a string of words;
   analyzing said received string of words according to grammatical rules to generate a parse tree;
   displaying said parse tree to a user; and
   receiving a user selection of nodes and/or edges of said parse tree in a particular order corresponding to a marked annotation.

3. The method as recited in claim 2 further comprising:
   creating a grammatical rule for parsing said string of words based on said marked annotation.

4. The method as recited 3 further comprising:
   creating a template corresponding to said created grammatical rule for parsing said string of words; and
   identifying a set of other templates in a same class as said created template.

5. The method as recited in claim 4 further comprising:
   analyzing said set of other templates in connection with said marked annotation.

6. The method as recited in claim 4 further comprising:
   modifying a parse tree associated with a template of said set of other templates to include said marked annotation, wherein said template is modified to include said modified parse tree; and
   adding said modified template to a library.

7. The method as recited in claim 4 further comprising:
   adding new words to a dictionary from words in one of said set of other templates with a corresponding parse tree containing edges that match edges of said parse tree displayed to said user.

8. A computer program product for generating rules to be utilized by a rule-based system, the computer program product comprising one or more computer readable storage mediums having program code embodied therewith, the program code comprising programming instructions for:
   extracting, by a word embedding generator, node states and edge states from parse trees;

generating, by said word embedding generator, word embeddings based on said extracted node states and edge states;

generating, by an artificial neural network engine, generic grammatical rules by a neural network using said word embeddings; and training, by said artificial neural network engine, said rule-based system using said generic grammatical rules.

9. The computer program product as recited in claim 8, wherein the program code further comprises the programming instructions for:

receiving a string of words;

analyzing said received string of words according to grammatical rules to generate a parse tree;

displaying said parse tree to a user; and receiving a user selection of nodes and/or edges of said parse tree in a particular order corresponding to a marked annotation.

10. The computer program product as recited in claim 9, wherein the program code further comprises the programming instructions for:

creating a grammatical rule for parsing said string of words based on said marked annotation.

11. The computer program product as recited 10, wherein the program code further comprises the programming instructions for:

creating a template corresponding to said created grammatical rule for parsing said string of words; and identifying a set of other templates in a same class as said created template.

12. The computer program product as recited in claim 11, wherein the program code further comprises the programming instructions for:

analyzing said set of other templates in connection with said marked annotation.

13. The computer program product as recited in claim 11, wherein the program code further comprises the programming instructions for:

modifying a parse tree associated with a template of said set of other templates to include said marked annotation, wherein said template is modified to include said modified parse tree; and adding said modified template to a library.

14. The computer program product as recited in claim 11, wherein the program code further comprises the programming instructions for:

adding new words to a dictionary from words in one of said set of other templates with a corresponding parse tree containing edges that match edges of said parse tree displayed to said user.

15. A system, comprising:

a memory for storing a computer program for generating rules to be utilized by a rule-based system; and a processor connected to said memory, wherein said processor is configured to execute program instructions of the computer program comprising:

extracting, by a word embedding generator, node states and edge states from parse trees;

generating, by said word embedding generator, word embeddings based on said extracted node states and edge states;

generating, by an artificial neural network engine, generic grammatical rules by a neural network using said word embeddings; and training, by said artificial neural network engine, said rule-based system using said generic grammatical rules.

16. The system as recited in claim 15, wherein the program instructions of the computer program further comprise:

receiving a string of words;

analyzing said received string of words according to grammatical rules to generate a parse tree;

displaying said parse tree to a user; and receiving a user selection of nodes and/or edges of said parse tree in a particular order corresponding to a marked annotation.

17. The system as recited in claim 16, wherein the program instructions of the computer program further comprise:

creating a grammatical rule for parsing said string of words based on said marked annotation.

18. The system as recited 17, wherein the program instructions of the computer program further comprise:

creating a template corresponding to said created grammatical rule for parsing said string of words; and identifying a set of other templates in a same class as said created template.

19. The system as recited in claim 18, wherein the program instructions of the computer program further comprise:

analyzing said set of other templates in connection with said marked annotation.

20. The system as recited in claim 18, wherein the program instructions of the computer program further comprise:

modifying a parse tree associated with a template of said set of other templates to include said marked annotation, wherein said template is modified to include said modified parse tree; and adding said modified template to a library.

* * * * *